July 22, 1958 E. H. STONICH ET AL 2,844,324
RADIATOR INLET VALVE
Filed June 27, 1952
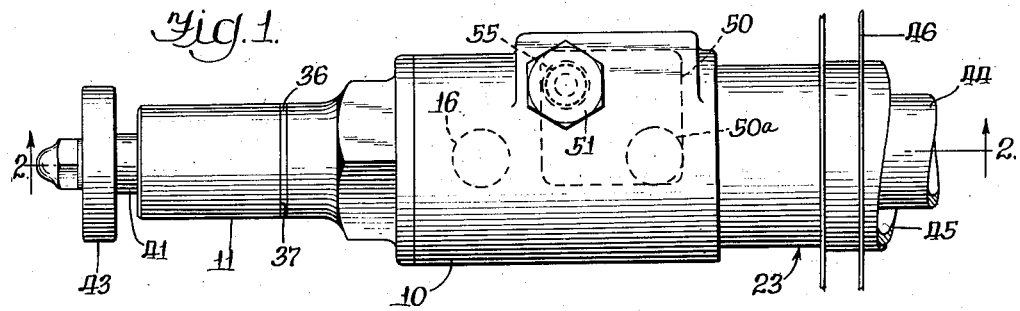
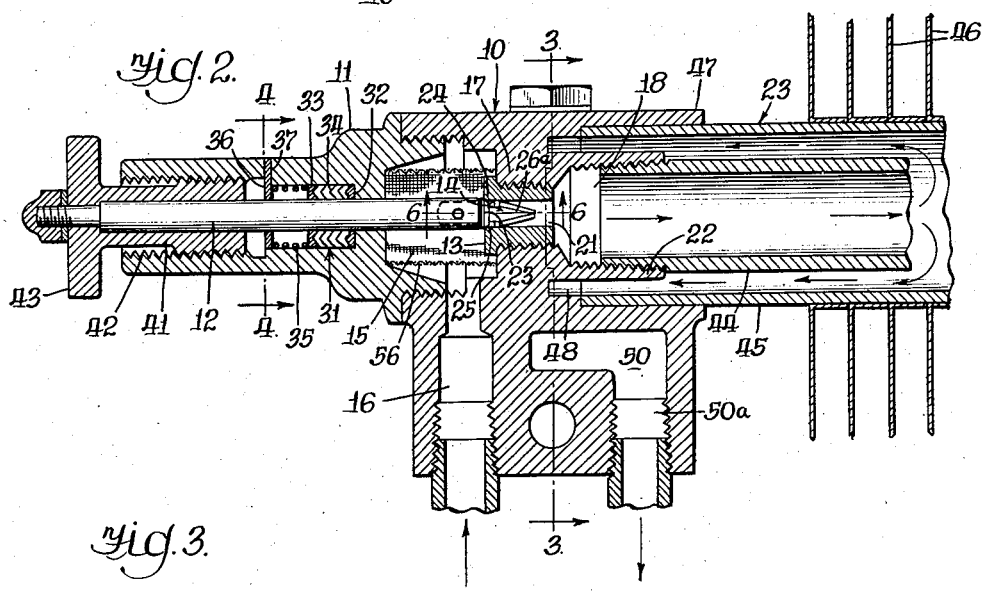
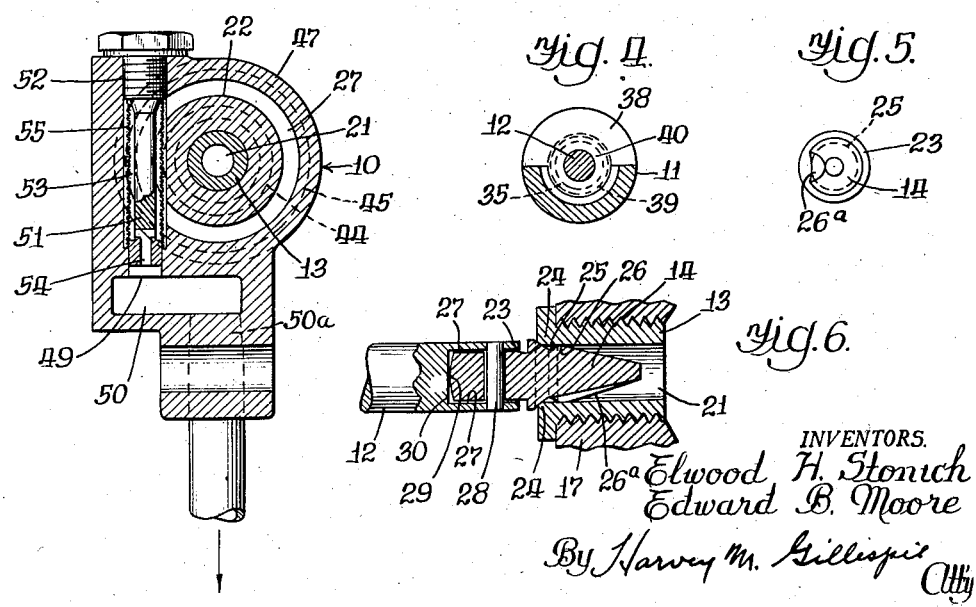
INVENTORS.
Elwood H. Stonich
Edward B. Moore
By Harvey M. Gillispie
Atty

United States Patent Office 2,844,324
Patented July 22, 1958

2,844,324

RADIATOR INLET VALVE

Elwood H. Stonich, Chicago, and Edward B. Moore, La Grange Park, Ill., assignors to Vapor Heating Corporation, Chicago, Ill., a corporation of Delaware Application June 27, 1952, Serial No. 295,987

2 Claims. (Cl. 237—73)

This invention relates to an improved valve structure which is particularly suitable for controlling the admission of heating medium, for example steam, into a heat radiator of a space heating system.

A principal object of the invention is to provide an improved valve structure in which a valve element is pivotally attached to an operating stem so that when the stem is out of alignment with the center of the admission port, the valve will assume an angular position so as to compensate for such malalignment of the stem and thereby insure positive closure of the inlet port.

A further object is to provide a valve of the above character which is so formed as to proportionately vary the delivery of heating medium throughout a relatively long travel of the valve element relative to the valve seat. In this connection, the invention contemplates the provision of a valve element having a relatively long tapered portion which is slidably supported within an admission port leading to a steam radiator and to also provide the said valve element with a groove in one side, communicating with a circular groove extending around the valve so as to insure a steam passage of adequate area to prevent vibration of the valve when it is adjusted to only a slightly open position.

Another object is to provide, in a radiator admission valve of the above character, a valve housing formed to provide a unitary fitting provided with inlet and outlet passages communicating with the radiator and provided in the outlet passage with a removable orifice fitting, whereby the outlet passage is restricted in relation to the size of the radiator so as to permit the outlet passage to remain constantly open to discharge condensate without the discharge of substantial amounts of steam. The outlet passage is also arranged in close relation to the steam inlet passage so as to receive heat therefrom and thereby prevent freezing of condensate being discharged.

Another feature of the invention is the provision of a pair of readily removable tubular screens one of which surrounds the admission valve port so as to prevent the admission of scale or other foreign matter into the radiator inlet port and the other screen surrounding the orifice fitting to prevent scale or foreign matter entering the restricted outlet opening of the said orifice fitting.

Another object is to provide improved means for packing the valve so as to provide constant sealing pressure to prevent leakage around the valve stem and which also simplifies the installation of the packing and prevents unwarranted tampering therewith.

The invention is illustrated, in certain preferred embodiments, in the accompanying drawing wherein:

Fig. 1 is a top view in elevation of the improved valve structure and a portion of a space heating element;

Fig. 2 is a vertical section through the structure shown in Fig. 1, the section being taken on line 2—2 thereof;

Fig. 3 is a transverse section taken through Fig. 2 substantially on line 3—3 to illustrate the position of the outlet orifice fitting;

Fig. 4 is a cross-sectional view taken on line 4—4 of Fig. 2 to illustrate the position of the element for retaining the packing in position;

Fig. 5 is an end view of the valve element looking at the valve from the right of Fig. 2; and Fig. 6 is a fragmentary sectional view taken on line 6—6 of Fig. 2, the valve parts being illustrated on a larger scale than that of Fig. 2.

The valve structure includes a main body element 10, a bonnet 11 enclosing an operating stem 12 and a valve seat element 13 for cooperating with a valve element 14 secured to the stem. The bonnet 11 has a threaded engagement with the main body and cooperates with a portion of the main body to define an inlet chamber 15 for receiving steam from a supply passage 16. A partition wall 17 separates the inlet chamber 15 from a delivery chamber 18. The valve seat element 13 is threaded into an opening in said partition wall 17 and is provided with a cylindrical bore 21 defining an admission port leading from the chamber 15 into the delivery chamber 18. The steam delivery chamber is defined by an internally threaded cylindrical portion 22 and has direct communication with the receiving end of a radiator 23.

The effective area of the admission port 21 is controlled by the valve element 14. This element is tapered toward its outer end and is slidably supported within the admission port 21 so that the volume of heating medium passing through port 21 may be proportionately varied throughout the entire travel of the valve element 14. When the valve element is in a position to close the port 21 a conical portion 23 of the valve bears against the correspondingly formed surface 24 of the valve seat 13. The tapered body portion of the valve element 14 is formed with a circular channel 25 extending around the valve element intermediate the tapered portion 23 thereof and a portion 26 having a diameter only slightly less than the inner diameter of the port 21. A groove 26a formed in the tapered portion of the valve element and extending lengthwise thereof connects with the circular channel 25 so as to provide a passage of adequate area for heating medium when the valve element 14 is only slightly open. The outer end of the valve element 14 is loosely supported within a cylindrical socket 27 formed in the inner end of the valve stem 12 and is loosely attached to the stem by means of a pin 28 Fig. 6. The loose fitting connection between the valve element 14 and the valve stem is sufficient to permit the valve element 14 to assume an angular position relative to the stem and thereby insure positive closing of the port 21 even though the longitudinal axis of the valve stem may be out of alignment with the longitudinal axis of the port 21. The outer end of the valve element is curved as indicated at 29 to provide a single point thrust bearing against the bottom 30 of the said socket 27.

The bonnet 11 includes a chamber 31 for containing suitable packing for the valve stem 12. The packing is preferably of the chevron type and includes a pair of metallic adapter rings 32—33 between which a plurality of compressible packing rings 34 are positioned. A coil spring 35 is interposed between the adapter ring 33 and an abutment plate 36 so as to exert pressure against the packing rings and thereby press them with uniform pressure into sealing engagement with the valve stem 12 and the walls of the chamber 31. The abutment plate 36 is inserted into a slot 37 which extends half-way through the bonnet 11. One portion 38 of the abutment plate 37 has a diameter corresponding to the external diameter of the transversely slotted portion of the bonnet 11 and another portion 39 of the said abutment plate is curved to fit the curvature of the packing chamber 31. The valve stem 12, it will be observed, extends through an opening 40 formed in the said abutment plate. Secured to the outer end of the stem 12 is a means for actuating the stem. This means may be varied to suit the situation in which the valve is employed. In the present instance the valve stem 12 is intended to be operated manually and, therefore, has a manually operated screw element 41 secured to the outer end of the stem 12 and has threaded engagement with an internally threaded portion 42 of the bonnet. The hand wheel for operating the screw is indicated at 43.

Referring again to the radiator 23: It is shown herein as composed of inner and outer pipes 44 and 45 arranged preferably, but not necessarily, in concentric relation to each other. The pipe 44 is threaded into the cylindrical portion 22 defining the delivery chamber 18 of the valve body. The said inner pipe 44 receives the steam from the delivery chamber 18 and discharges it into the pipe 45 near the outer end thereof which is remote from the valve structure whereby the steam and condensation flows in the outer pipe toward the valve structure. The outer pipe 45 is usually provided with a plurality of spaced apart fins 46 which provide extended heat radiating surfaces. The inner end of the outer pipe 45 is suitably bonded or otherwise secured to the interior of a cylindrical flange 47, the latter of which cooperates with the cylindrical portion 22 of the body to define an annular space 48. This space 48, and consequently the discharge end of the radiator, connects with an outlet passage 49 (Fig. 3) which, in turn, communicates with an outlet chamber 50 and discharge passage 50a. The said bore 49 is arranged at one side of the center of the main body element 10 and extends, as clearly shown in Fig. 3, from the top surface of the body to the outlet chamber 50.

The outlet end of the radiator is open to the atmosphere at all times through the said bore 49, outlet chamber 50 and outlet passage 50a, but the outlet is restricted by means of an orifice fitting 51 fitted into the bore 49 so as to permit the condensate to discharge from the system without permitting substantial amounts of steam to be discharged. The orifice fitting 51 is in the form of a plug screwed into the threaded upper portion 52 of the bore 49. The central portion of the plug is reduced in diameter so as to provide a space 53 surrounding the plug and the lower end of the plug is formed with a T-shaped restricted passage 54 through which the condensation discharges into the outlet chamber 50. In order to prevent scale or other foreign matter from being carried into the restricted outlet 54, a tubular screen 55 surrounds the reduced portion of the plug 51. The screen, it will be observed, can be removed with the plug for the purpose of cleaning, when such cleaning is desired.

As a further precaution against scale entering the valve controlled port 21, a cylindrical screen 56 is positioned in the inlet chamber 15 so as to surround the valve stem and valve element and thereby prevent scale or other foreign matter from entering the port 21 in a manner to interfere with the proper operation of the valve.

We claim:

1. In combination with a steam heated radiator having a steam inlet end and a condensate discharge end arranged in close relation to each other, a valve structure including a housing provided with portions defining steam delivery and condensate discharge passages attached to the inlet and discharge ends, respectively, of said steam heated radiator, a valve for controlling the delivery of steam to the radiator in quantities to produce condensation therein, and a flow restricting plug removably positioned in said discharge passage and provided with a continuously open discharge orifice therein of relatively small size whereby condensate collects adjacent the orifice to prevent the discharge of steam; a wall of the said discharge passage and the flow restricting plug being positioned in contiguous heat transfer relation to a wall of said steam delivery passage, whereby the heat from the steam in said delivery passage is transmitted through the said valve housing to the said plug and to the condensate in the discharge passage so as to prevent freezing of the latter in cold weather.

2. The combination structure defined in claim 1 characterized in that said plug is formed with a portion of reduced diameter intermediate its ends for communicating with the radiator outlet, and the said discharge orifice is a passage of restricted area through a portion of said plug and leading from the space surrounding said reduced portion of the plug, and further characterized by the provision of a tubular screen surrounding the reduced portion of said plug but spaced therefrom so as to prevent scale and other foreign matter from blocking said discharge orifice.

References Cited in the file of this patent

UNITED STATES PATENTS

| | | |
|---|---|---|
| 952,063 | Bishop | Mar. 15, 1910 |
| 1,583,050 | Keller | May 4, 1926 |
| 1,627,840 | Donnelly | May 10, 1927 |
| 1,730,322 | Gartin | Oct. 1, 1929 |
| 1,799,667 | Ziegler | Apr. 7, 1931 |
| 1,988,819 | Stuart | Jan. 22, 1935 |
| 2,050,041 | Czarnecki | Aug. 4, 1936 |
| 2,087,621 | Lorraine | July 20, 1937 |
| 2,190,723 | McBride | Feb. 20, 1940 |
| 2,213,053 | Russell | Aug. 27, 1940 |
| 2,229,600 | Park | Jan. 21, 1941 |
| 2,310,745 | Park et al. | Feb. 9, 1943 |
| 2,372,502 | Lehane et al. | Mar. 27, 1945 |
| 2,516,825 | Hejduck | July 25, 1950 |
| 2,602,629 | McChesney | July 8, 1952 |
| 2,603,446 | Harding | July 15, 1952 |
| 2,646,959 | Carver | July 28, 1953 |
| 2,654,395 | Kaye | Oct. 6, 1953 |
| 2,654,560 | Smith | Oct. 6, 1953 |